(No Model.) 5 Sheets—Sheet 1.
J. I. CASE, M. B. ERSKINE & W. W. DINGEE.
THRASHING MACHINE.
No. 250,133. Patented Nov. 29, 1881.

(No Model.) 5 Sheets—Sheet 2.

J. I. CASE, M. B. ERSKINE & W. W. DINGEE.
THRASHING MACHINE.

No. 250,133. Patented Nov. 29, 1881.

Witnesses:
Inventors (No Model.) 5 Sheets—Sheet 5.
J. I. CASE, M. B. ERSKINE & W. W. DINGEE.
THRASHING MACHINE.
No. 250,133. Patented Nov. 29, 1881.

Witnesses:

Inventors,
Jerome I. Case
Massena B. Erskine
William W. Dingee
By their Attorney

United States Patent Office.

JEROME I. CASE, MASSENA B. ERSKINE, AND WILLIAM W. DINGEE, OF RACINE, WISCONSIN.

THRASHING-MACHINE.

SPECIFICATION forming part of Letters Patent No. 250,133, dated November 29, 1881.

Application filed July 21, 1881. (No model.)

*To all whom it may concern:*

Be it known that we, JEROME I. CASE, MASSENA B. ERSKINE, and W. W. DINGEE, citizens of the United States, residing at Racine, in the county of Racine and State of Wisconsin, have invented certain new and useful Improvements in Thrashing-Machines; and we do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Figure 1:
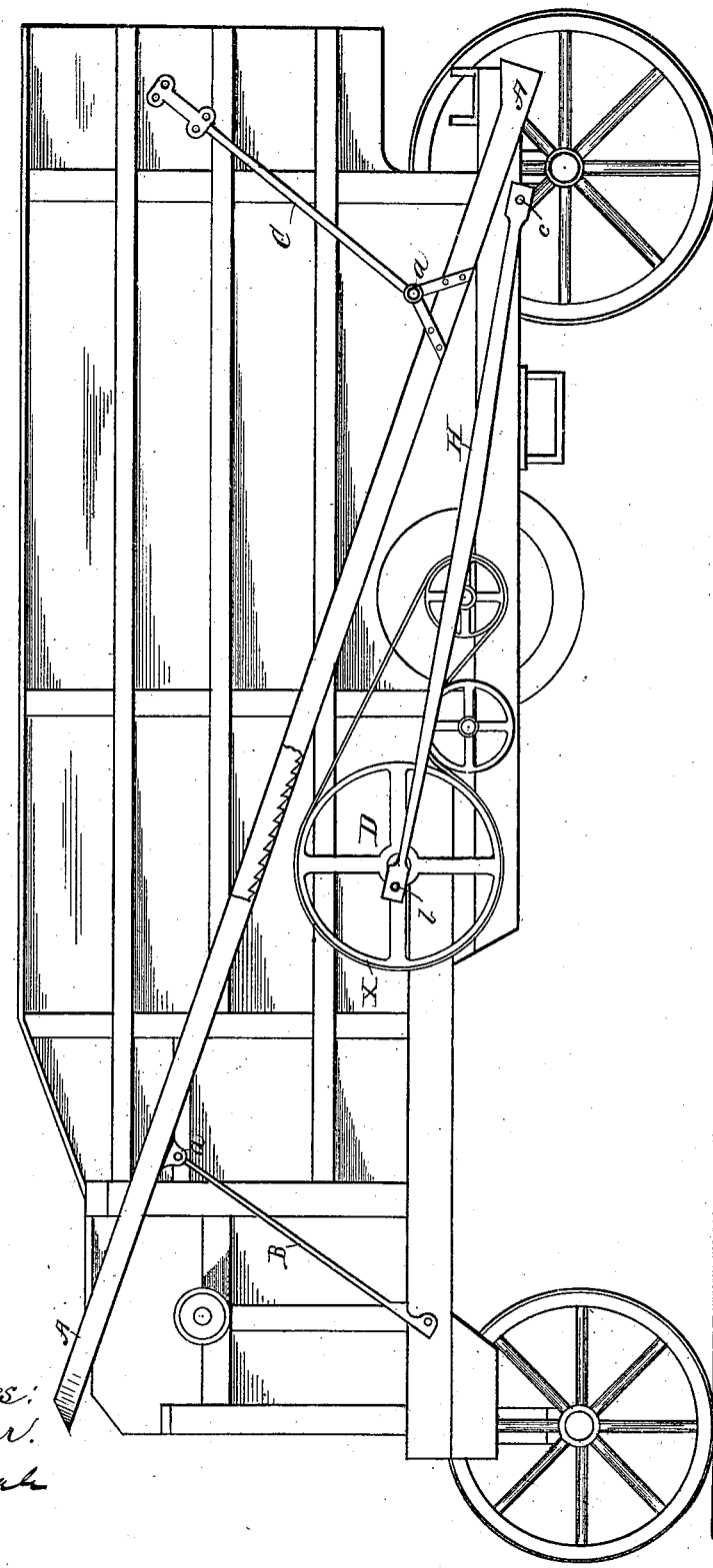
Figure 2:
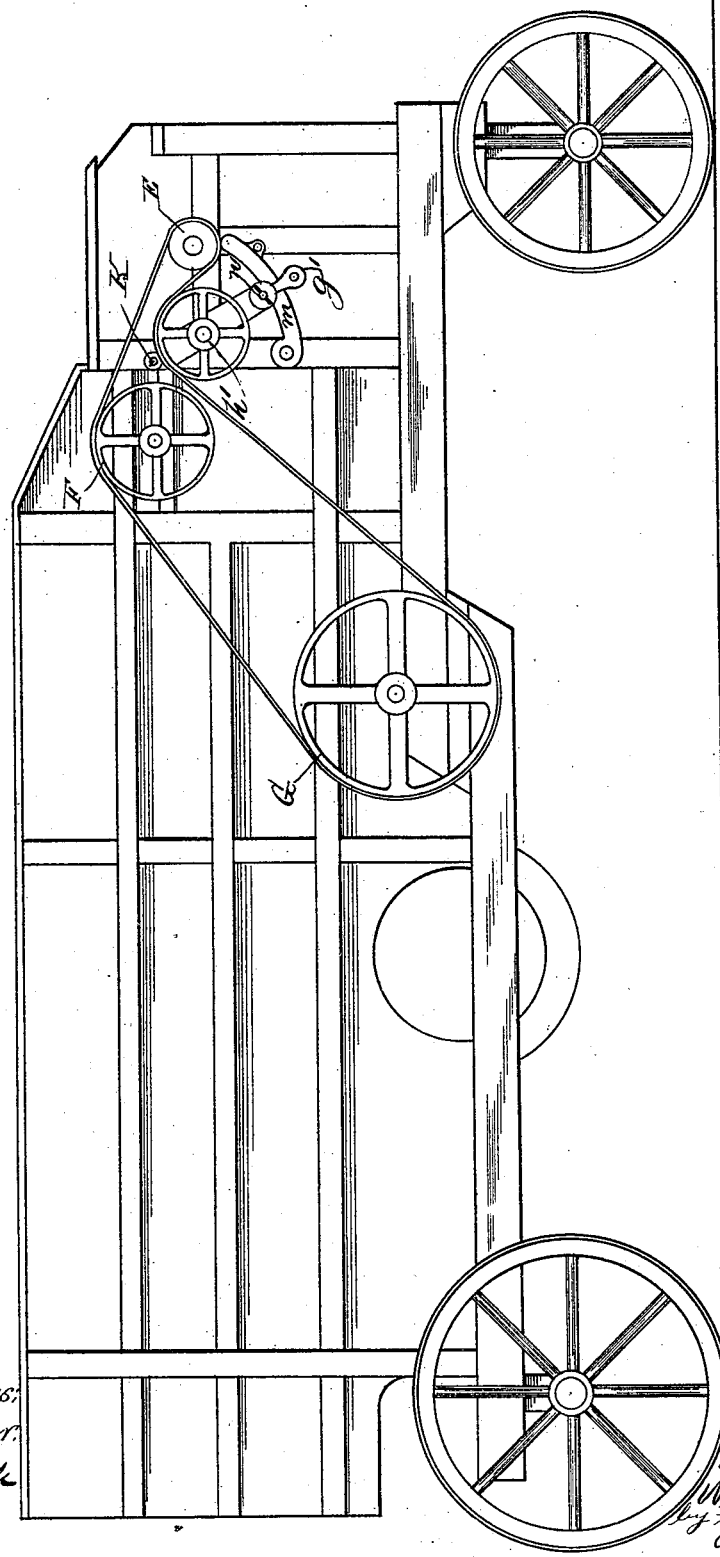
Figure 3:
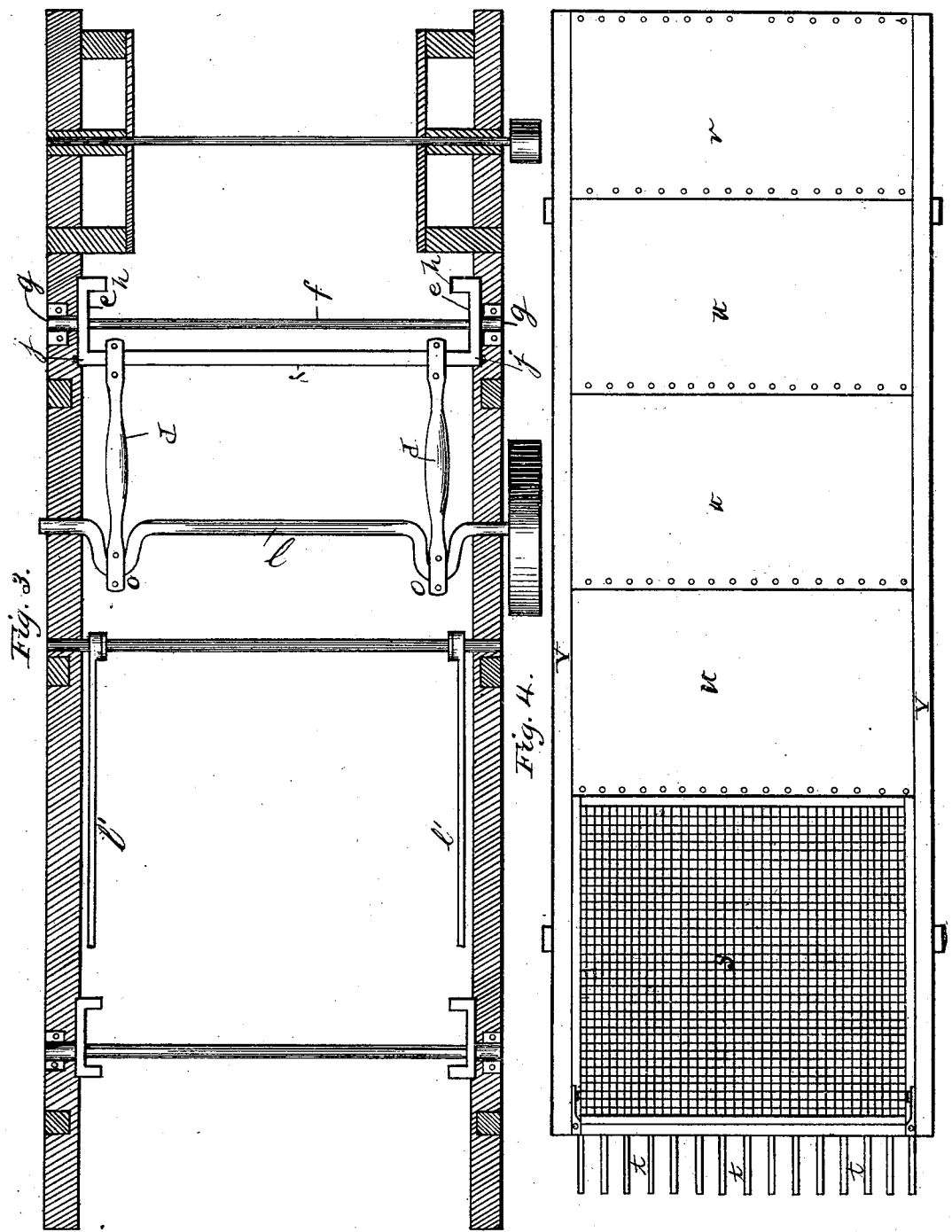
Figure 4:
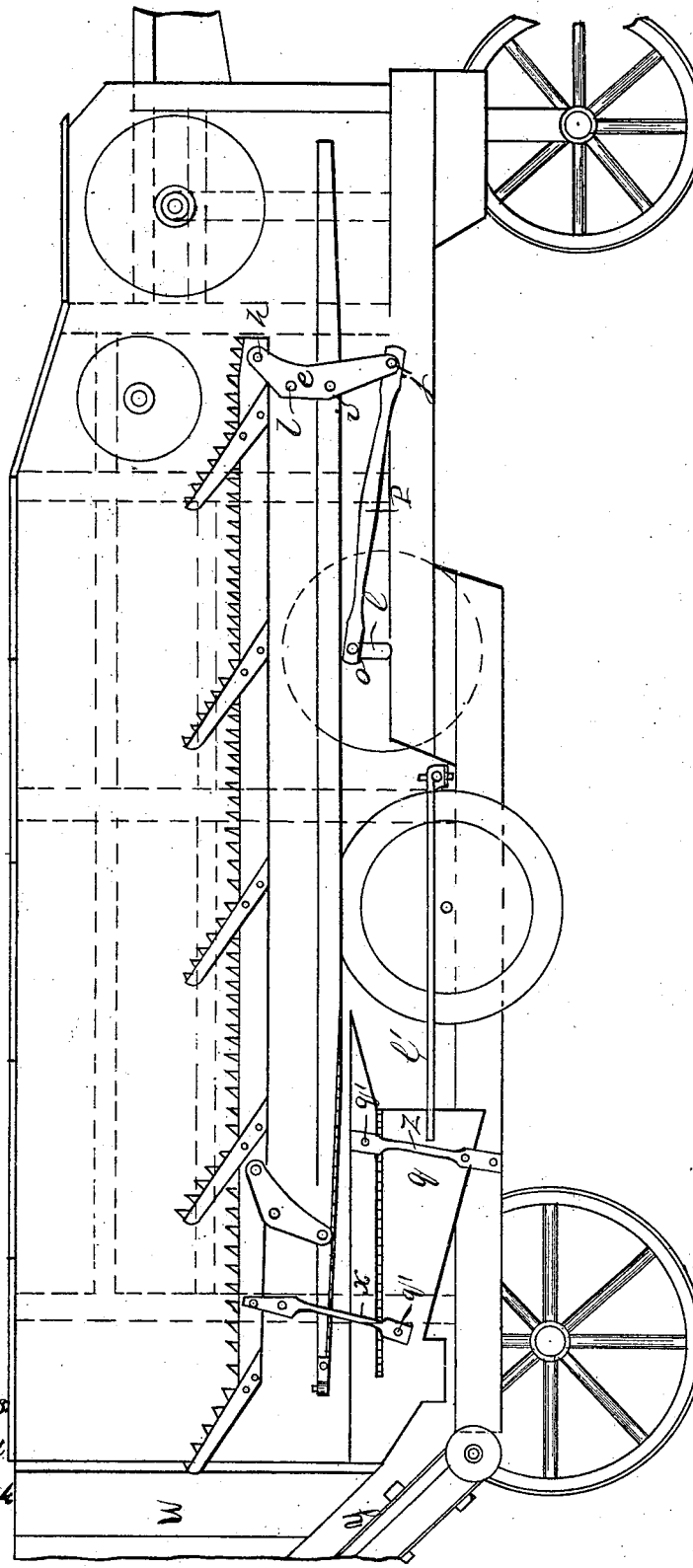
Figure 5:
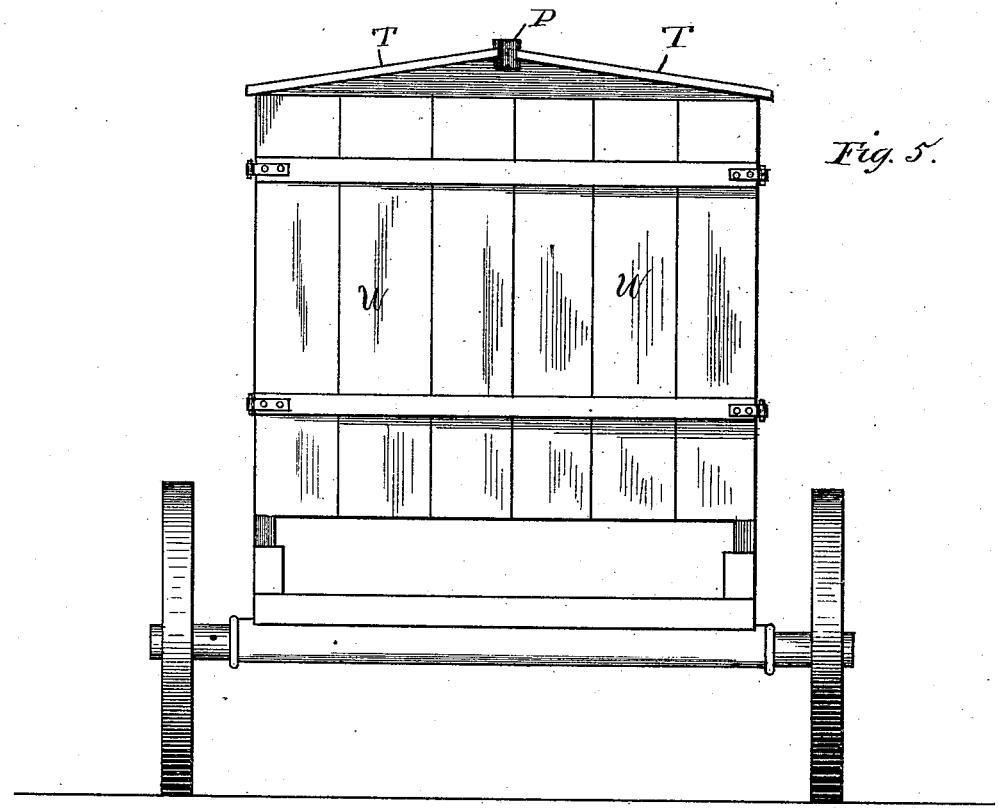
Figure 7:
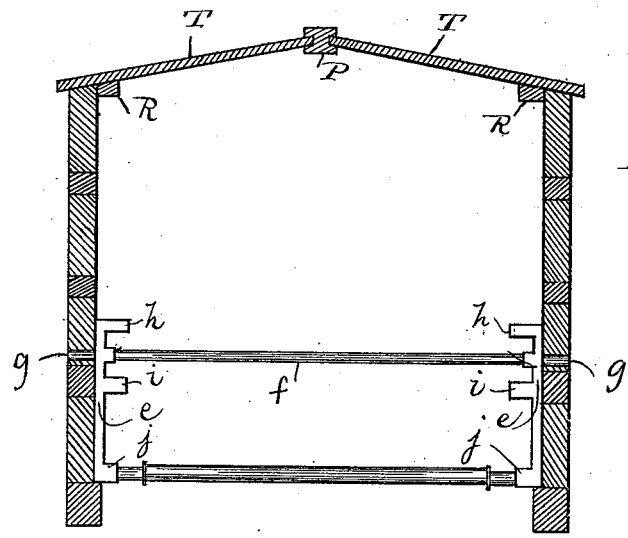

Figure 1 is an elevation of the right side of the machine, showing manner of attaching and moving elevator. Fig. 2 is an elevation of left side of machine, showing manner of adjusting the tension of the driving-belt. Fig. 3 is a horizontal section of the lower part of the machine, showing the way of applying power to moving parts of the separator. Fig. 4 is the grain-conveyer removed from the machine. Fig. 5 is a view of rear end of machine, with the stacker wind-doors closed to protect the machine from storms when not in operation. Fig. 6 is a vertical section of the separator and lower part of straw-stacker, showing the stacker wind-doors as used when machine is in operation, and manner of sustaining straw-rack and grain-conveyer; also way of hanging shoe on springs. Fig. 7 is a cross-section of machine, showing manner of covering or roofing; also view of manner of driving the separator.

Fig. 1, A shows the elevator in its place at the side of the separator. It is supported at its upper end by springs B, and is suspended at the lower end by a similar spring, C. Spring B is rigidly attached at its lower end to the sill of the separator, and spring C is similarly attached at its upper end to the separator-side. The elevator A is secured to springs B C by hinge-joints *a a*. The springs B C yield sufficiently to admit of the necessary movement of the elevator, and, being strained when the elevator is at its lowest point, assist in its upward movement. The elevator A is given a reciprocating movement by pitman H, which connects wrist-pin *c*, secured to the bottom of the elevator, and adjustable wrist-pin *b*, attached to arm of pulley X. The springs B C are set at an angle to the line of the elevator, the object being to give an up and down as well as backward and forward movement to the elevator. The bottom of the elevator is cut in the form of steps, (as shown, where a section of the side of the elevator is represented as broken away.) The object of this notching of the bottom is to prevent the tailings from slipping back. When springs B C are set at the proper angle, this elevator will take up all the tailings that come into it. The upper end curves round, so as to discharge into the cylinder. The movement of elevator A is regulated by the distance at which wrist-pin *b* is set from the center of pulley X. This manner of elevating tailings by a trough with notched bottom upwardly inclined is not new. Our improvement is confined to the manner of hanging and applying power to the elevator.

Fig. 2, E is the driving-pulley on the cylinder-shaft. F is a pulley on the beater-shaft. G is a pulley on the crank-shaft. One belt runs over all these pulleys, as shown in Fig. 2. *h* is a pulley which runs loose on a journal attached to arm *g'*. Arm *g'* admits of a radial movement from fixed point K. It is held fast at any desired point by a clamp attachment, *n*, which moves with arm *g'* and secures it to fixed quadrant *m*. Clamp *n*, in connection with arm *g*, forms a vise, which is closed by a bolt and thumb-nut, quadrant *m* coming between the jaws of this vise. As pulley E is liable to vary in its number of revolutions from irregular feeding of the cylinder and other causes, it is necessary that the belt should slip after the proper speed is reached for pulleys F and G, or otherwise grain will be wasted. To do this requires an exact adjustment of the tightener-pulley *h'*. This we secure by clamp *n* and fixed quadrant *m*, as described. An adjustable pulley to tighten a belt in a thrashing-machine is not new; but the arm to which the pulley is attached is usually held in a toothed rack, the objection to this method being that the lever cannot be moved less than a notch, and is not held firmly.

In Figs. 3, 6, 7 are shown different views of the manner of applying the power to the moving parts of separator, the object being to apply the power on both sides of the machine directly to the moving parts and avoid the trouble of loose keys, the same letter in the different figures relating to the same part.

e e, Fig. 7, are similar castings secured to shaft f, which has its bearings or journals at point g. Casting e has three journals or wrist-pins, cast as part of it, and lettered, respectively, h i j.

l, Figs. 3 and 6, is a crank-shaft having cranks o o, Fig. 3, of the same throw and on the same plane. These cranks o o are connected with wrist-pins j by two pitmen, P P. These pitmen are of the same length. When crank-shaft l is revolving, castings e e receive a backward and forward or oscillating movement which is radial from shaft f as a center. Journals j j are hollow. r is a stay between journals j j. A rod passes through journal j and stay r, and has a nut on each end. Wrist-pins h h move the straw-rack, to which they are attached by suitable boxes. Wrist-pins i i move the grain-conveyer in a similar manner. The movements of straw-rack and grain-conveyer are both radial from shaft f as a center. The straw-rack has a movement of three inches upward and two inches forward. The grain-conveyer has a movement of one inch upward and two inches forward. The effect of this movement is to carry both straw and grain to the rear of the machine. Castings e e, being secured together in the manner described and having the wrist-pins cast as part of them, furnish a medium for applying power to the straw-rack and grain-conveyer more reliable than is possible where the power is applied to the shaft, and through it to other moving parts. Shaft f may be stationary, and castings e e move thereon, if preferred.

Fig. 4 is a top view of the grain-conveyer removed from the machine. Its position in the machine is under the straw-rack, and is for the purpose of receiving the grain as it falls through the rack and conveying it to the shoe of the fan. It is made of sides v v, closed bottom u u, sieve s, and tailings-rake t. Sieve s is over the shoe in the fan, and tail-rake t is hinged to conveyer-sides v v, so that it can be raised to permit access to the sieves in shoe. This sieve s and tail-rake t, having the same movement as the grain-conveyer, throw off straw, sticks, &c., without the aid of the blast, and deliver the grain to the sieves in the shoe in an even, uniform manner, so as to avoid all liability to clog.

When thrashing in windy weather, side-boards are necessary to the lower end of the stacker, to keep the straw from being blown away as it falls from the machine to the stacker.

When the machine is not in operation it is desirable that the rear end should be closed for the protection of the sieves and shoe.

w, Fig. 6, shows our side-board in position for the protection of stacker y. It is hinged to the rear end of the separator, and can be opened for access to the shoe, or when the stacker is off can be closed, as shown in Fig. 5, thus serving a twofold purpose.

q, Fig. 6, shows the shoe of the fanning-mill. It is suspended at its rear end by springs x, and supported at its inner end by similar springs, z. Its movement is endwise, and has a very short, quick stroke. It is connected by pitman l' l', Figs. 3 and 6, with crank-shaft l. Springs x z are attached rigidly to the separator-frame, and have round holes q' q' in their ends. Journals are attached to the shoe, that fit in holes q' q'. The springs yield enough to accommodate the movement of shoe. Pitman l' is securely bolted to the shoe, and spring enough to accommodate the crank movement. The cranks on shaft l have five-sixteenths throw, the shaft revolving about four hundred times per minute. The entire absence of joints in the hanging of this shoe gives it a noiseless movement.

P, Fig. 7, is a ridge-pole extending from end to end of the main part of the machine, and is elevated to give pitch to the cover. A groove on each side receives the cover T. This cover is made in convenient sections to admit of access to the straw-rack. Each section has a bottom, R, secured to it, and which, when the cover is in place, comes just inside of the separator-casing, and holds the section of cover from coming out, the object being to provide a cover that can be removed, and that will shed the rain over each side of the machine.

What we claim as our invention, and desire to secure by Letters Patent, is—

1. The combination, substantially as before set forth, of the reciprocated tailings-elevator and the spring from which its lower end is suspended.

2. The combination, substantially as before set forth, of the reciprocated tailings-elevator and the springs for supporting its respective ends.

3. The combination, substantially as before set forth, of the inclined reciprocated tailings-elevator, the spring beneath it for supporting its upper end, and the spring above it for supporting its lower end.

4. The combination, substantially as before set forth, of the driving-pulley on the thrashing-cylinder shaft, the driven pulley on the fan-shaft, the driving-belt, and the belt-tightener, adjusted to permit slipping of the belt whenever the speed of the cylinder-shaft pulley is accelerated beyond the point for giving the maximum speed to the fan-shaft.

5. The combination, substantially as before set forth, of the sides of the separator, the elevated grooved ridge-pole, and the removable covers provided with battens, whereby the separator is covered by a pitched roof composed of sections that can be removed for access to the interior of the machine.

6. The thrashing-machine provided at its rear end with hinged doors, adapted to serve also as wind-guards for the stacker, substantially as before set forth.

In testimony whereof we affix our signatures in presence of two witnesses.

JEROME I. CASE.
MASSENA B. ERSKINE.
WILLIAM W. DINGEE.

Witnesses:
CHARLES H. LEE,
GEO. L. EDDY.